Dec. 9, 1930.   A. DE SAMSONOW   1,784,658
APPARATUS FOR AGGLOMERATING AND ROASTING MINERALS
Filed Dec. 23, 1927   3 Sheets-Sheet 1

Witnesses:
G. Dewilde
E. David

Inventor
Alexandre de Samsonow
per
Attorney

Dec. 9, 1930.  A. DE SAMSONOW  1,784,658
APPARATUS FOR AGGLOMERATING AND ROASTING MINERALS
Filed Dec. 23, 1927  3 Sheets-Sheet 3

Witnesses:

Inventor
Alexandre de Samsonow
per
Attorney

Patented Dec. 9, 1930

1,784,658

UNITED STATES PATENT OFFICE

ALEXANDRE DE SAMSONOW, OF BRUSSELS, BELGIUM, ASSIGNOR, BY MESNE ASSIGNMENTS, TO SOCIETE POUR L'ENRICHISSEMENT ET L'AGGLOMERATION DES MINERALS, SOCIETE ANONYME, OF BRUSSELS, BELGIUM

APPARATUS FOR AGGLOMERATING AND ROASTING MINERALS

Application filed December 23, 1927, Serial No. 242,197, and in Belgium January 4, 1927.

I have made applications as follows: in Belgium, Patent No. 339,059 dated 4th January, 1927; in Germany, dated 8th February, 1927; in France, No. 233,417, dated 3rd March, 1927; in Great Duchy of Luxemburg, No. 14,833, dated 14th February, 1927, and of which the following is a specification.

The present invention relates to improvements in apparatus for agglomerating and roasting minerals comprising a receptacle having a grate which receives a charge of the material to be treated and having a suction device, and in which fine and pulverulent combustible material may or may not be utilized as the source of heating according to the nature of the material to be treated.

Several methods of emptying these furnaces of their agglomerated contents are already known, but they all involve tipping the furnace. Thus the said furnaces are tipped in situ, and this causes the liberation of large quantities of dust within the building. Moreover these furnaces must be arranged at a sufficient height and this necessarily entails increased costs for construction and maintenance.

To obviate the production of dust within the building it has been proposed to provide travelling furnaces which are tipped outside. This however merely takes the dust outside the furnace room and at the same time very greatly increases the cost of construction of the furnaces and requires considerable apparatus for manipulation.

Finally, furnaces mounted on endless tracks are also known, and these also obviate the liberation of dust within the building, but the cost of construction and maintenance of these is also very high, apart from the fact that their application results in a less perfect sintering, gives a large quantity of fine ore and an inferior output as compared with the other processes mentioned.

The present invention has for its object to simplify and improve the method of emptying agglomerating and like furnaces such as calcining and roasting furnaces, and to obviate the inconveniences enumerated above; these furnaces are stationary during grating and cannot be tipped while discharging.

To effect this object the displacement of the material treated in stationary furnaces is effected by a simple sliding movement relatively to the grate or furnace.

This method of discharging the furnace may be carried into practical effect in several ways particularly by a pushing element which is moved over the grate or by the displacement of the latter with respect to the treated material or again by the displacement of the grate so as to carry with it the treated material which will thus slide out of the furnace.

Several forms of the present invention are shown by way of example in the accompanying drawings. Figures 1 to 4 show plan views and vertical sections respectively of two methods of carrying away the agglomerated material after it has been removed from the grate by a simple pushing action.

Figure 1:
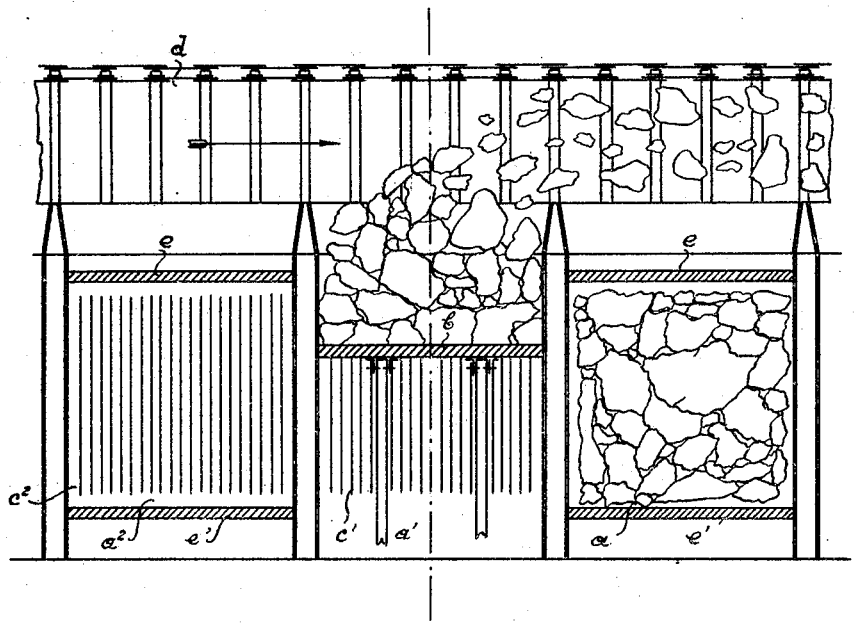
Figure 2:
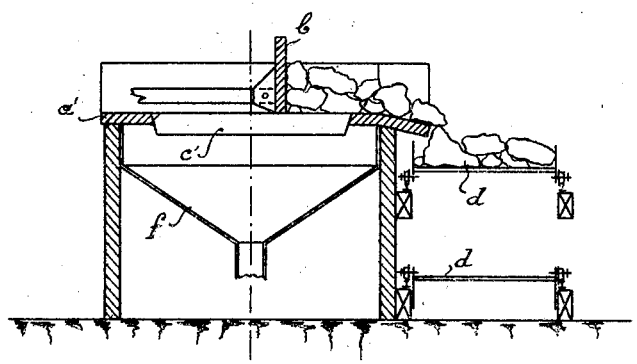

Figure 1 shows a series of three fixed rectangular furnaces $a$, $a1$, $a2$ side by side. The first contains the material to be treated, the second is partially emptied by the action of a pushing element C which extends right across the width of the furnace $a'$ and slides on the grate $c'$. The material is pushed on to a travelling band $d$. The front and rear walls $e$, $e1$ are movable so that they can be lifted after the material has been roasted, so as to permit of the movement of the pusher C. It should be noted here that the front wall might serve as the working face of the pusher. Below the grate $c$, $c1$, $c2$ are disposed the suction chambers $f$, which may be of very air-tight construction, as the furnaces are absolutely fixed.

Figure 3:
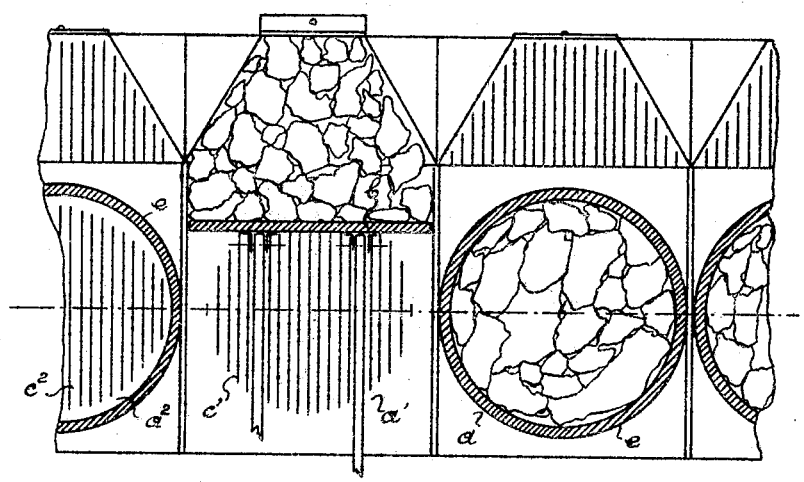
Figure 4:
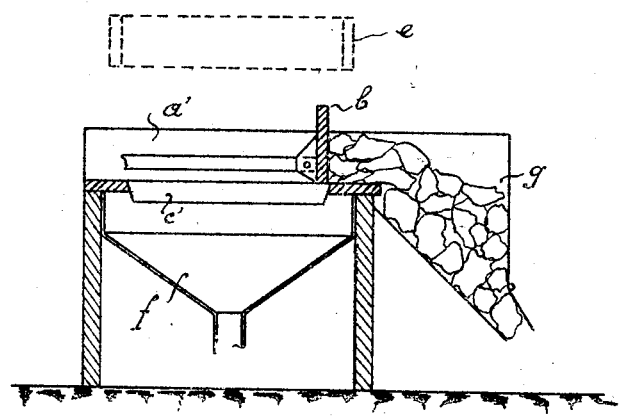

Figures 3 and 4 show another construction in which furnaces of the cylindrical form shown in the drawing or of another suitable form are so constructed that the walls $e$ rest directly on a table $a$, $a1$, $a2$ which itself carries the grate $c1$, $c2$. The suction chambers $f$ are disposed below this table. When the agglomeration is completed the vertical walls are raised and the agglomerated material is pushed on to a conveyor band as described above, or into a hopper $g$.

Figure 5:
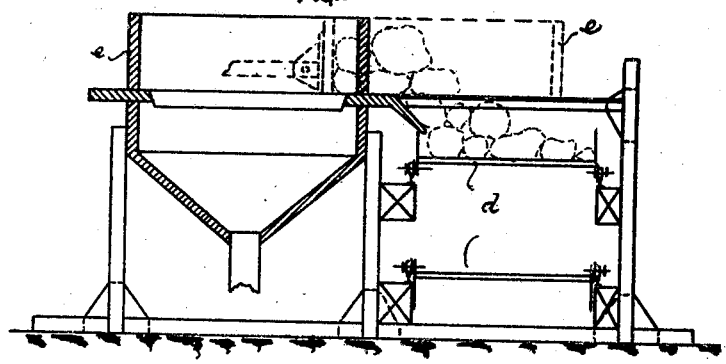
Figures 5 and 6 are vertical sections of two modified forms.

A third modification of the construction is illustrated in Figure 5. The walls $e$ of the furnace which, as in the preceding case, form a bottomless box are pushed into the discharging position when the roasting is finished, so that the agglomerated material falls on to a conveyor band $d$ or into any suitable receptacle. In this case the conveyor band is disposed slightly below the level of the grate.

Figure 6:
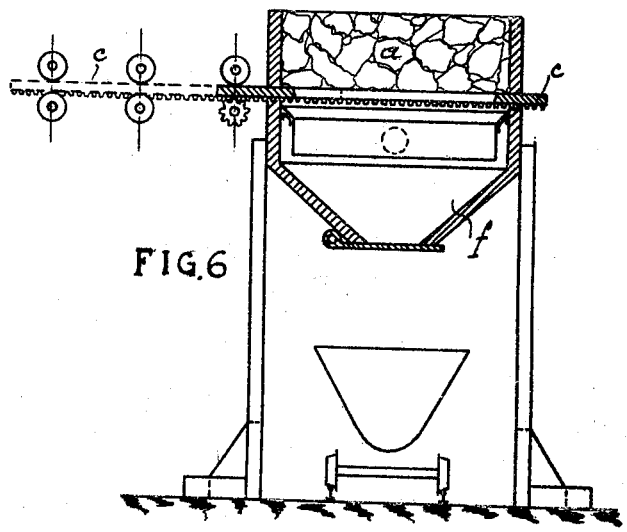

The fourth form of construction is shown in Figure 6. The grate $c$ is movable and can be withdrawn from beneath the agglomerated material after sintering, as shown in dotted lines. The sintered material or the like falls into the suction chamber $f$ which contains the discharging apparatus.

Figure 7:
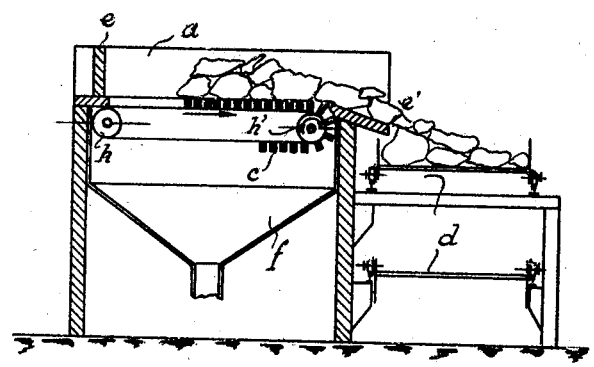
Figure 7 is vertical section of a chain grate furnace that is to say one in which the bars are articulated.

Finally, according to Figure 7 the fixed furnace $a$ is provided with a reciprocating chain grate $c$ which is fixed during the sintering, and is moved for the purpose of discharging by two parallel rollers $h, h1$. Instead of a reciprocating movement the grate may have a continuous movement, being made in the form of an endless chain. When the sintering or agglomeration is completed one of the lateral walls $e1$ is raised and the material is displaced towards the side of the furnace by the movement of the grate and discharged for example on to conveyor band $d$.

The advantages of fixed furnaces are considerable. They are easy to construct and of low cost. They can be worked by hand and permit of economy in motive power as any movement of heavy masses is avoided. Moreover not only is the liberation of dust in the building effectively avoided, but also the formation of this dust is diminished owing to the absence of tipping.

The invention has been described and illustrated by way of example only, and not limitation, and it is obvious that many modifications may be made in its details without departing from its essential nature.

I claim:—

1. Means for discharging treated material from mineral roasting agglomerating and like apparatus having a grating comprising a receiver for treated material disposed adjacent said grating and a movable rear wall to said furnace, said rear wall being movable across the grating to the receiver.

2. Means for discharging treated material from mineral roasting agglomerating and like apparatus having a grating comprising a receiver for treated material disposed adjacent said grating, and a bottomless box movable from a working position over the grating to a discharge position at the side of the grating.

ALEXANDRE DE SAMSONOW.